May 25, 1937.                    Á. BARÉNYI                    2,081,727
RETARDING MECHANISM FOR PHOTOGRAPHIC SHUTTERS
Filed Nov. 20, 1935
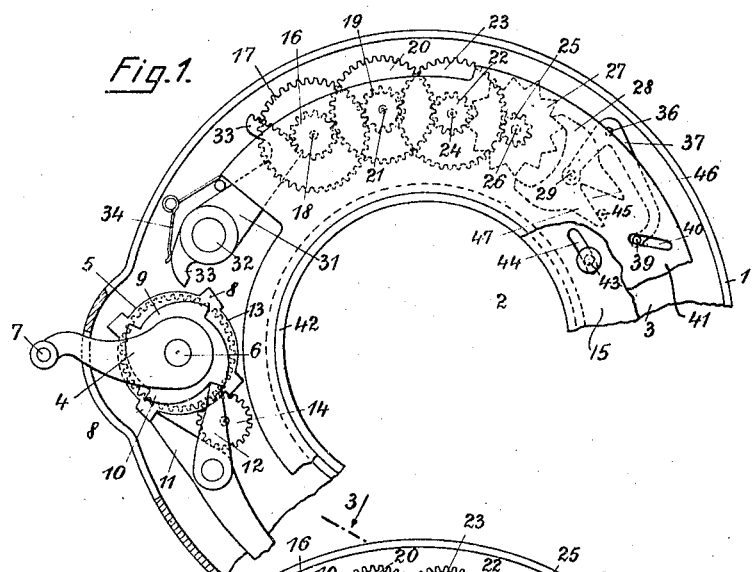
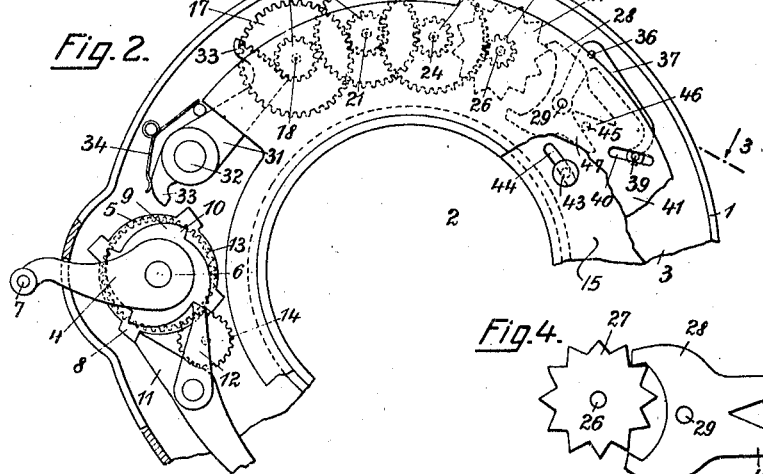
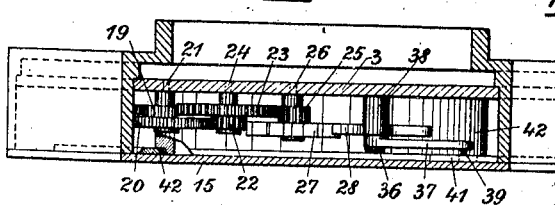
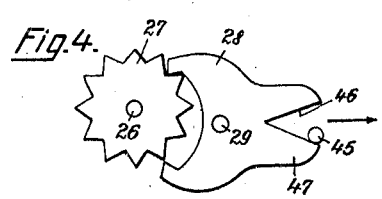
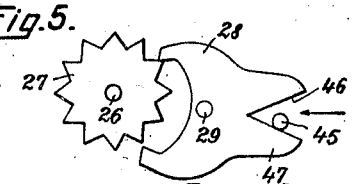
Inventor:
Árpád Barényi
by Franz Reichd
Attorney.

Patented May 25, 1937

2,081,727

UNITED STATES PATENT OFFICE 2,081,727

RETARDING MECHANISM FOR PHOTOGRAPHIC SHUTTERS

Arpad Barényi, Berlin-Steglitz, Germany, assignor to Voigtlander & Sohn Aktiengesellschaft, Brunswick, Germany Application November 20, 1935, Serial No. 50,756
In Germany November 27, 1934

2 Claims. (Cl. 161—26)

My invention relates to improvements in retarding mechanisms for photographic shutters, and more particularly in retarding mechanisms of the type comprising an escape wheel and an anchor or pallet cooperating therewith for controlling the retarding action of the said mechanism. The object of the improvements is to provide a mechanism of this type by means of which the retarding action may be accurately varied within broad limits, and with this object in view my invention consists in providing means for varying the range of the swinging movement of the anchor or pallet and the depth of engagement thereof in the teeth of the escape wheel.

For the purpose of explaining the invention an example embodying the same has been shown in the accompanying drawing in which the same reference characters have been used in all the views to indicate corresponding parts. In said drawing Fig. 1 is a fragmentary elevation of the shutter with the plate closing the shutter casing removed and certain parts broken away, the pallet being shown in the position in which it is in full engagement with the teeth of the escape wheel and in which it is capable of wide swinging movement, Fig. 2 is a similar elevation showing the pallet in the position retracted away from the escape wheel, so that the depth of engagement between the same and the teeth of the escape wheel and also the range of the swinging movement are reduced, Fig. 3 is a top plane view of Fig. 2 viewed in the direction of the arrows 3—3, Fig. 4 is a diagrammatical detail elevation showing the escape mechanism detached from the retarding mechanism, the parts being in the same position as in Fig. 1, and Fig. 5 is a similar elevation showing the parts in the same position as in Fig. 2.

For the purpose of explaining the invention I shall describe the same in connection with a retarding mechanism controlling the shutter operating mechanism and the time of exposure, but I wish it to be understood that my invention is not limited to the use in such retarding mechanisms.

In the example shown in the figures the shutter comprises the usual annular casing 1 having a central exposure or lens opening 2 normally closed by the blades (not shown). Upon a partition member 3 most of the shutter operating mechanism including a motor or master member 4 and the retarding mechanism thereof is carried. The motor or master member comprises a housing 5 having a spiral spring confined therein, which spring is connected with one end to the housing and with its opposite end to an arbor 6 carrying a setting lever 7. The said housing is formed with lugs 8, and the setting lever is connected with a disk 9 formed with teeth 10. The said lugs and teeth are engaged respectively by latches 11 and 12 connected with the operating mechanism. The housing 5 is formed with gear teeth 13 engaging in a pinion 14 connected with the shutter operating mechanism (not shown). As is known to those skilled in the art by rocking the setting lever 7 in anti-clockwise direction the spring is put under tension, whereupon the disk 9 and the arbor 6 are locked in position by the latch 12. Thereafter the housing likewise tends to turn in anti-clockwise direction, but for the present it is locked in position by the latch 11 engaging one of the lugs 8. When the latch 11 is retracted from the said lug by the operating mechanism the housing rotates in anti-clockwise direction and such rotary movement is transmitted by means of the said gear teeth and the pinion 14 to the shutter operating mechanism. On the partition member 3 and a plate 15 connected therewith a retarding mechanism is mounted which comprises a pinion 16 connected with a gear wheel 17 and rotatably mounted therewith on a bolt 18, a pinion 19 meshing with the gear wheel 17 and a gear wheel 20 connected therewith and both mounted on a bolt 21, a pinion 22 meshing with the gear wheel 20 and connected with a gear wheel 23 and both mounted on a bolt 24, a pinion 25 meshing with the gear wheel 23 and connected with an escape wheel 27 and both mounted on a bolt 26, and an anchor or pallet 28 engaging in the teeth of the said escape wheel and mounted on a bolt 29. On a bolt 32 a lever 31 is rockingly mounted which is formed with a toothed sector 33 meshing with the pinion 16, and the said lever is formed with a heel 33 located in position for engagement with the lugs 8 of the housing 5, and a spring 34 acting on the lever 31 tends to rock the same in anti-clockwise direction and into the position shown in Fig. 1.

The mechanism so far described and its operation are known in the art, and I deem it not necessary to describe the same more in detail. But for a detailed description reference is made to Patents Nos. 1,828,215 and 1,843,265 granted to me respectively October 20, 1931 and February 2, 1932.

Referring now to the parts to which my invention more particularly relates, the pivot bolt 29 on which the pallet or anchor 28 is mounted is not fixed to the partition member 3, but it is mounted on an arm of a bell crank lever 37 pivotally mounted on a pin 36 fixed to a lug 38 carried by the partition member 3. To the other arm of the said bell crank lever a pin 39 is fixed, which is in engagement with a slot 40 made in a ring 41 rotatably mounted on a lens tube 42 fixed to the partition member 3. The said ring 41 carries a pin 43 passed outwardly through a slot 44 made in the plate 15 and carrying a button by means of which the ring 41 may be moved by hand from the outside of the shutter casing in circumferential direction.

To the partition 3 a pin 45 is secured which engages in an outwardly flaring cut-out portion 46 made in a rearwardly extending heel 47 of the anchor or pallet 28.

The retarding action of the mechanism depends on the position of the anchor or pallet 28 relatively to the escape wheel 27 and the pin 45. When the said pallet is in the position shown in Fig. 1 in which its lips are in full engagement with the teeth of the escape wheel 27 and the pin 45 acts on the outer portions of the heel 47 thus permitting a large range of the swinging movement of the pallet, the retarding action of the pallet is large by reason of the said large range of movement, and when the pallet is set into the position shown in Fig. 2 in which its lips engage the outer ends of the teeth of the escape wheel and the pin 45 engages the inner part of the cut-out portion 46, the range of movement of the pallet is small, and therefore its retarding action is likewise small.

I have found, that by merely varying the range of movement of the pallet without simultaneously varying the engagement of the lips of the pallet with the teeth of the escape wheel exact regulation of the retarding action is not attained, because when the mechanism is started with the pallet in the position shown in Fig. 1 it takes some time before the pallet swings through its full range of movement. However, in the construction shown in the figures in which the lips of the pallet are in full engagement with the teeth of the escape wheel the pallet swings through the whole range of movement, and therefore it has its full retarding action from the beginning of the operation.

I claim:

1. Retarding mechanism for the shutters of photographic cameras, comprising an escape wheel and a pallet cooperating therewith, said pallet being formed at the side of its pivot remote from its lips with an outwardly flaring cut-out portion, a stop passed through said cut-out portion, and means adapted to be operated from the outside of the shutter casing for shifting the said pallet with its pivot bolt towards and away from said escape wheel and relatively to said stop.

2. Retarding mechanism for the shutters of photographic cameras, comprising an escape wheel, and a pallet cooperating therewith, a stop adapted to limit the range of movement of said pallet, and means for bodily moving the said pallet towards and away from said escape wheel and relatively to said stop, said stop and the portion of said pallet which cooperates therewith being shaped so that the play of the pallet relatively to the stop is reduced as the pallet is moved away from the escape wheel.

ÁRPÁD BARÉNYI.